United States Patent [19]

Collette

[11] Patent Number: 4,541,023
[45] Date of Patent: Sep. 10, 1985

[54] RESOLVER WITH SEQUENTIAL FREQUENCY AND PHASE CORRECTION

[75] Inventor: Michael L. Collette, San Francisco, Calif.

[73] Assignee: Otari Electric Co., Ltd., Tokyo, Japan

[21] Appl. No.: 474,693

[22] Filed: Mar. 11, 1983

[51] Int. Cl.³ ................. G11B 15/52; G11B 27/00
[52] U.S. Cl. ........................... 360/73; 360/13; 369/47; 318/314; 318/317; 318/318
[58] Field of Search ............... 360/73, 13; 369/47; 318/314, 317, 318, 341, 606–608; 226/9; 307/519, 234; 328/140, 141

[56] References Cited

U.S. PATENT DOCUMENTS

| | | | |
|---|---|---|---|
| 3,441,342 | 4/1969 | Ball et al. ........................... | 360/73 |
| 3,778,693 | 12/1973 | Korteling ............................ | 318/314 |
| 3,787,615 | 1/1974 | Foerster et al. .................... | 360/73 |
| 3,828,234 | 8/1974 | Goldberg ............................ | 318/314 |
| 4,271,382 | 6/1981 | Maeda et al. ....................... | 318/318 |
| 4,301,395 | 11/1981 | Furuhata et al. ................... | 318/314 |
| 4,338,640 | 7/1982 | Yabu et al. ......................... | 360/73 |

Primary Examiner—Raymond F. Cardillo, Jr.
Assistant Examiner—Steven R. Garland
Attorney, Agent, or Firm—C. Michael Zimmerman

[57] ABSTRACT

Apparatus for adjusting the speed of an audio tape capstan to a speed such that an audio tone prerecorded on the tape corresponds to a reference frequency, the apparatus thereafter phase locking the frequency of the audio tone to the reference frequency. The apparatus stores a signal corresponding to the last tape speed utilized even after the tape has stopped, allowing for faster phase lock after the tape has started again. Logic circuitry determines the presence of a valid tape audio tone, and means are included for adjusting the system gain to substantially reduce any wow or flutter which normally would result from damaged or spliced tape. A phase adjust knob is provided to allow for offset of the phase locked condition if necessary. The apparatus includes a pair of frequency-to-voltage converters which provide an essentially ripple-free DC voltage output while permitting a response time of only a few cycles of a relatively low (typically 60 Hertz) input frequency.

17 Claims, 4 Drawing Figures

RESOLVER WITH SEQUENTIAL FREQUENCY AND PHASE CORRECTION

BACKGROUND OF THE INVENTION

It is often necessary in the motion picture and television broadcasting industries to synchronize an audio recorder to a video device, such as a camera or video recorder, particularly when the audio portion of a scene is recorded with equipment separate or remote from the video recording equipment. For example, film recording in the field utilizes cameras which are generally heavy and cumbersome and thus not easily carried to film scenes at rapidly changing locales. Thus, a portable audio tape device, remote and separate from the camera, is usually provided to record the audio portion of the scene. The audio tape usually includes a track which has a recorded pilot tone, either a nominal 60 Hertz sine wave or a modulated signal, which will allow the audio tape speed to be frequency synchronized to a master signal, and thus to the video tape or film, at the broadcast or film studio. The actual device which accomplishes this is known as a resolver. In essence, both the output signal from a master sync generator, typically 60 Hertz (generated at the studio) and the signal from the tape pilot track are coupled to the resolver, the resolver generating a signal proportional to the difference in frequency between the two signals. The difference signal is coupled to a motor via a voltage controlled oscillator (VCO) to drive the audio tape capstan, the capstan being increased or decreased in speed depending upon the variation of the output frequency of the VCO from a nominal value, typically 9600 Hertz. The speed of the tape is thus adjusted until it reaches the speed demanded by the master synchronization signal for frequency synchronization.

In addition to bringing the audio tape into frequency (speed) synchronization with the master signal, it is also necessary to phase synchronize the two signals. Many prior art systems combine the frequency/phase synchronization adjustment in one circuit. However, doing so often is not appropriate since there are trade-offs between phase and frequency adjustments when a single circuit is utilized to accomplish both functions. In particular, a relatively long time lag usually results between a validated input and the validated output at the low system frequencies utilized. Further, the prior art resolvers are generally configured to be responsive only to very slight variations (typically ±10%) from the 60 Hertz frequency established by the master generator. It may be necessary, however, for the resolver to be responsive to greater frequency variations. For example, if the audio device batteries are weak when the audio recording is made so that the tape is driven at a speed corresponding to a 40 Hertz pilot signal, instead of the 60 Hertz nominal value (a variation of approximately 33%), prior art resolvers would be unable to respond to bring the audio tape to proper speed (The same would hold true if it was necessary to vary the speed of the master signal significantly from the nominal value to increase or decrease the playing time of the film or videotape). In addition, the phase lock capabilities of these resolvers tend to vary with the speed demanded by the master signal.

As is well known, audio tape can be damaged, or separate tape portions spliced together. Prior art resolvers will detect the splice in repaired or edited tape, treat it as a pilot phase error, and speed up the tape when locking thereto. This can cause noticeable transport wow or flutter. An additional disadvantage is that after frequency and phase synchronization has been accomplished and the tape subsequently has been stopped, the resolver has to repeat such synchronization after the tape has restarted, thus slowing overall system operation.

A frequency-to-voltage converter is required in most prior art resolver systems. Frequency-to-voltage conversion is a fairly common operation in electronic circuitry; the typical method involves converting an input frequency into a pulse train and then integrating the pulses to provide an average DC voltage output proportional to the input frequency. One major trade-off with this method is conversion response time vs. allowable ripple on the output voltage: at low input frequencies, very slow integration time constants must be utilized to minimize output ripple, degrading response time; conversely, rapid response time dictates a rapid integration of the frequency pulses, creating a large ripple component on the output signal at low input frequencies.

It is possible to multiply the input frequency before conversion to reduce output ripple without adversely affecting response time; simple frequency doubling can be effected if the input signal maintains a constant 50% duty cycle at all frequencies. More complex multiplication schemes involve response lags and conversion uncertainties of their own which can compound the response/ripple tradeoff. All of these methods will only reduce the output ripple, and at low frequencies the response/ripple tradeoff must still be addressed.

Digital approaches may be employed to eliminate periodic ripple on the output voltage; a typical method would be to time the interval between repetitions of the input signal and convert the relative number obtained into a voltage, which would be proportional to the input frequency. In many applications, however, the need for a stable timing source, counter, latches, and a digital-to-analog converter create a situation untenable from both cost and component count considerations.

SUMMARY OF THE INVENTION

The present invention provides apparatus for adjusting the speed of an audio tape capstan to a speed such that an audio tone prerecorded on the tape corresponds to a reference frequency, the apparatus thereafter phase locking the frequency of the pilot tone to the reference frequency.

The reference frequency and audio pilot tone frequencies are each converted to corresponding voltages in a converter designed to provide essentially ripple-free output voltages at relatively low operating frequencies, typically 60 Hertz. Both voltages are compared by a comparator, the output thereof being coupled to a storage device, such as a charge pump. The output of the storage device is coupled to a summing amplifier, the effective output of which is coupled through a voltage controlled oscillator (VCO) to a motor which drives the tape capstan.

If the voltage comparison produces a difference signal within a predetermined range, the output of a reference-synchronized ramp generator is sampled, the sampling times being controlled by the tape pilot frequency pulses. The sampled output is coupled both to the storage device and the summing amplifier which drives the VCO, the VCO output controlling the capstan motor in a manner such that the frequency of the audio tone and the frequency of the reference signal are both frequency and phase synchronized.

The present invention provides a rapid and accurate device for controlling the speed of an audio tape recorder capstan to phase lock the frequency of the prerecorded audio tone to a master, or reference, frequency. The use of sequential frequency and phase correction circuitry ensures that a consistent phase lock within a relatively large range of speeds (frequencies) can be achieved, the frequency of either the master or the speed of the tape (and thus the frequency of the pilot tone) being variable. In other words, relatively constant phase lock versus speed is achieved. The storage device (charge pump) retains the voltage (charge) corresponding to the last tape speed utilized even after the tape has stopped, allowing for faster phase lock after the tape has started again.

The above described apparatus most desirably also includes logic circuitry for determining the presence of valid tape pilot signal, and means for adjusting the system gain to substantially reduce any wow or flutter which normally would result from damaged or spliced tape. Moreover, most desirably a phase adjust knob is provided to allow for offset of the phase locked condition if necessary.

The frequency-to-voltage converter utilized in the apparatus provides an essentially ripple free DC voltage output while permitting a response time of only a few cycles of a relatively low input frequency, the disadvantages of prior art digital (cost and component count) and analog (response/ripple tradeoff) approaches thus being eliminated.

DESCRIPTION OF THE DRAWING

For a better understanding of the invention as well as other objects and further features thereof, reference is made to the following description of a preferred embodiment which is to be read in conjunction with the following figures wherein:

FIGS. 4(A)-4(E) are the waveforms associated with the block diagram of FIG. 3.

DESCRIPTION OF THE PREFERRED EMBODIMENT

Figure 1:
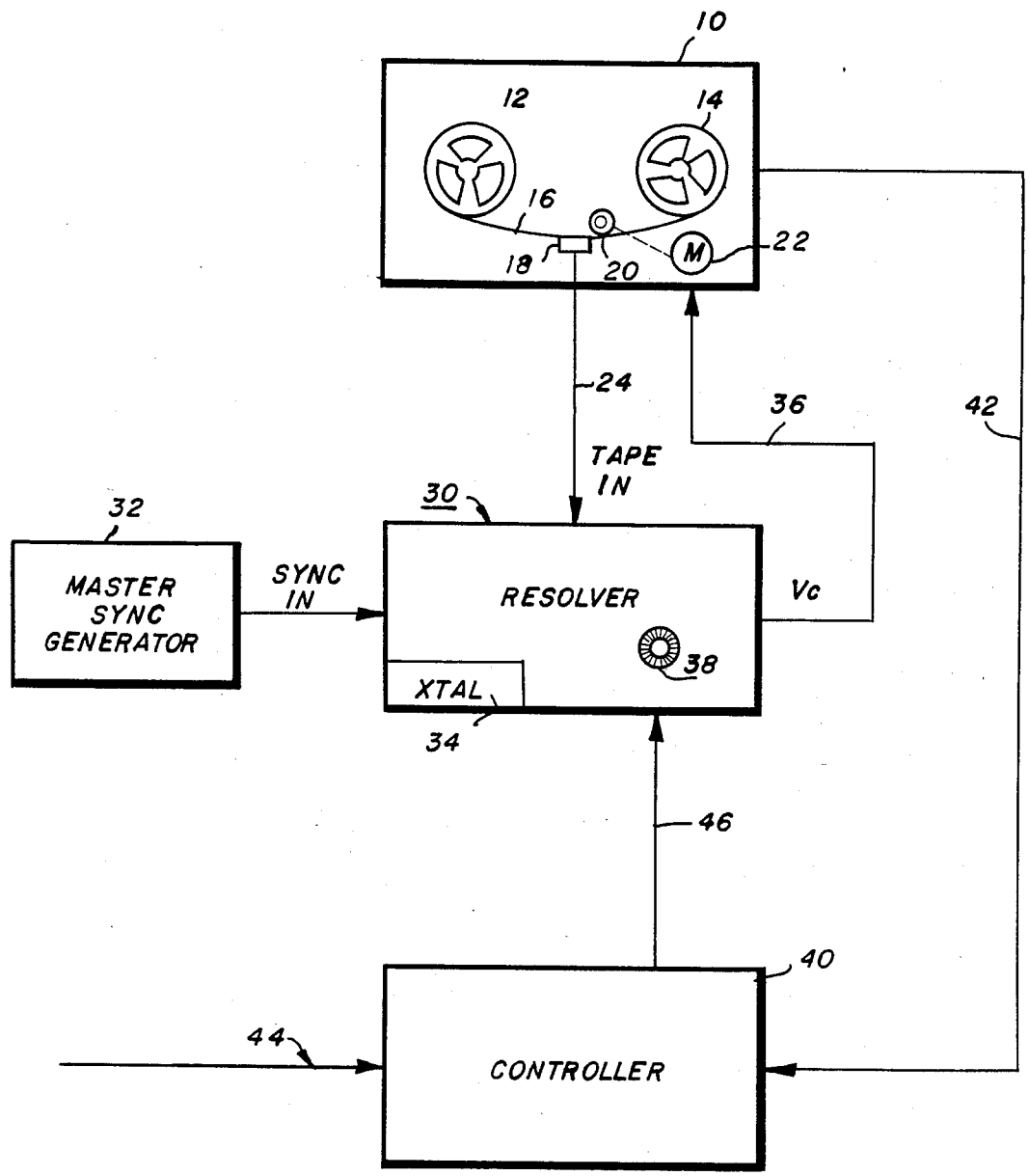
FIG. 1 is a simplified block diagram illustrating the system in which the present invention is utilized.

Referring now to FIG. 1, the simplified block diagram shows an audio recorder 10 having a supply reel 12, takeup reel 14, recorded tape 16, magnetic read head, 18, tape capstan 20 and capstan drive motor 22. The output signal from magnetic head 18 is coupled to the apparatus 30 of the present invention via lead 24. As is typical with most studios, whether film or broadcasting, a master sync generator 32 is provided and functions to generate a reference signal (nominally 60 Hz), to synchronize an audio device, such as recorder 10, to a video tape, movie film, or camera device. In the embodiment illustrated, apparatus 30 is provided with its own internal crystal oscillator timer 34, suitable for use as the master sync reference in lieu of an external master source.

A pilot tone, typically 60 Hertz, prerecorded on one of the tracks of tape 16, is fed to apparatus 30 via lead 24 and compared with a master synchronization signal supplied to apparatus 30, either by master synchronization generator 32 or internal timer 34. The master synchronization signal is illustrated in the figure as SYNC IN and the pilot tone as TAPE IN. As will be described hereinafter in more detail, a frequency comparison is initially made and a signal is generated on output lead 36. If the signal is greater than 9600 Hertz (9600 Hertz corresponding to normal capstan speed), the signal causes capstan motor 22 to increase in speed and seek to bring the tape and master signal to within 1 Hertz of synchronization at which time other circuitry in resolver 30 is enabled to allow for a sequential phase comparison and eventual phase lock. If the signal on lead 36 is less than 9600 Hertz, the capstan motor 22 is caused to slow down, SYNC IN and TAPE IN being brought to within 1 Hertz of frequency synchronization at which time the system switches to a phase comparison mode, apparatus 30 then bringing the signals to frequency and phase synchronization.

Since at initial startup the position of the audio tape may differ from the desired location (to properly synchronize the sound and picture), a micro-processor-based controller 40 may be provided to rapidly reduce the out-of-synchronization error prior to the apparatus 30 becoming fully operative. In particular, controller 40 receives tape position information from a specially encoded track of the tape on device 10 over lead 42, and location information over lead 44 from a similar track on the film or video tape (not shown) with which synchronization is desired. Such controller reacts thereto by determining the position of each and generating a signal on lead 46 to resolver 30 to enable resolver 30 to make a relatively rapid and coarse adjustment towards synchronization. A phase adjust knob 38 can be provided to allow for slight adjustment of the phase lock condition after frequency and phase synchronization has been reached.

It should be noted that the term "resolver" has been utilized herein to describe the frequency/phase synchronization described above since it is commonly utilized in the movie and video recording industries. Further, a system using a resolver 30 with a microcomputer based controller 40 is generally referred to as a "synchronizer".

The resolver 30 as described, it should be noted, could be utilized in other systems which require frequency/phase synchronization of two signals.

Figure 2:
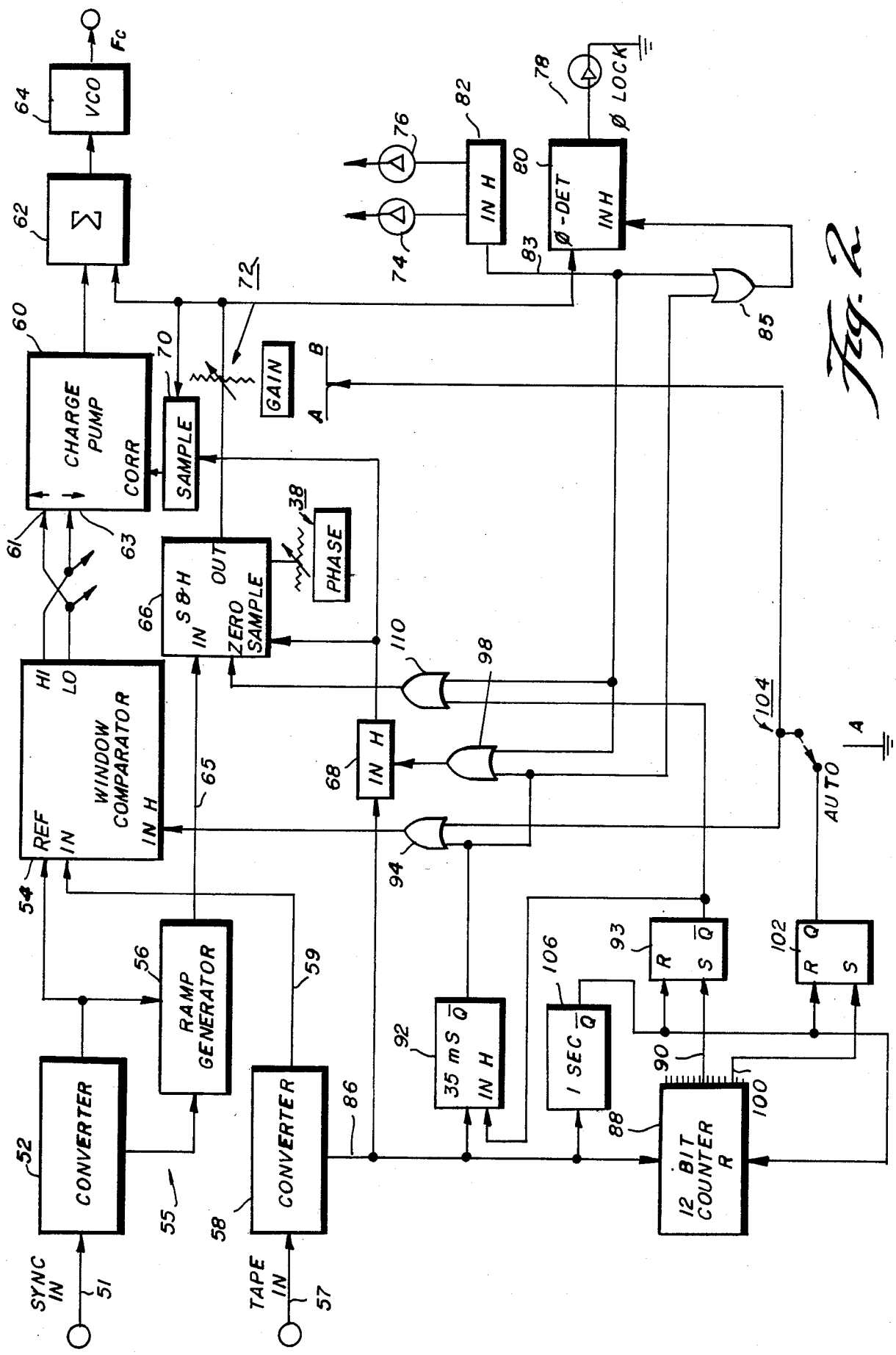
FIG. 2 is a block diagram of a preferred embodiment of the resolver of the present invention.

FIG. 2 is a block diagram of the resolver 30 of the present invention.

The output signal SYNC IN from master sync generator 32 (or internal crystal oscillator 34) is coupled to the input of frequency-to-voltage converter 52 via lead 51. Converter 52 provides an essentially ripple-free DC output proportional to the frequency of the SYNC IN signal, while permitting a response time of only a few cycles of input frequency. This represents a significant improvement over prior art converters. Details of converter 52 are set forth hereinafter with reference to FIGS. 3 and 4.

The voltage output of converter 52 is connected to one input (REF) of a window comparator 54 and to one input of constant amplitude ramp generator 56. Comparator 54, shown in illustrative form, has two comparators, the first (HI) indicating when a voltage input at (IN) is greater, in the positive sense, than a predetermined amount above (REF); the second (LO) indicating when a voltage input is less (more negative) than the predetermined level below (REF). The shaped pulse output of converter 52 (pulses corresponding to the frequency of SYNC IN) is applied to the other input of ramp generator 56 via lead 55. Generator 56 provides a linear ramp from 0 to approximately 5 volts in synchronism with each cycle of the SYNC IN frequency. The ramp generator 56 is arranged to retain the same amplitude at all SYNC IN frequencies.

The TAPE-IN signal on lead 57 is applied to the input of a frequency-to-voltage converter 58, converter 58 being identical to converter 52. The voltage output of converter 58 is applied to the other input (IN) of window comparator 54 via lead 59. The HI output of comparator 54 is applied to the decrease input 63 of a charge pump (storage capacitor) 60 and the LO output is applied to the increase input 61 of charge pump 60. The output of charge pump 60 is coupled to one input of summing amplifier 62 and the output of amplifier 62 is coupled to the input of voltage controlled oscillator (VCO) 64, the output (Fc) of VCO 64 being coupled to capstan motor 22 (FIG. 1).

The output of ramp generator 56 is coupled to the IN input of ramp sample and hold device 66 via lead 65, the output of device 66 being coupled to the other input of amplifier 62.

The window comparator 54 is configured such that if the output voltage from converter 58 is more than ±100 mv from the output of converter 52 (corresponding to a 1 Hertz variation in frequency), the appropriate comparator device in window comparator 54 turns on and applies an appropriate correction signal to charge pump 60. The output of charge pump 60, via amplifier 62, forces the frequency of VCO 64 to change, altering the speed of the capstan 20 of the audio device 10 (and therefore the pilot track frequency).

As will be set forth in more detail hereinafter, the operation of comparator 54 is disabled when the compared voltages are within 100 mv (corresponding to a frequency difference of less than 1 Hertz between the inputs) and the zero to five volt ramp generated by ramp generator 56 is sampled by sample and hold device 66. The sample commands are the pulses from the converter 58 and are applied to the sample input of device 66 via inhibit gate 68. Preferably, the samples are multiplied by a gain of two and offset by −5 volts: thus if phase synchronization is achieved, a sample in the center of the ramp produces zero volts output while a sample at the top (5 v) or bottom (0 v) of the ramp produces a + or −5 volt output, respectively. Switchable gains 72 control the magnitude of the voltage output from device 66 fed to the subsequent circuitry.

The charge pump 60 receives correction signals from comparator 54 and stores a charge (voltage) at its output which is summed in amplifier 62 with the output of device 66 to generate a control signal for VCO 64. Additionally, samples of the output from device 66 are taken by sample device 70 under command from converter 58 and supplied to charge pump 60 as an ongoing error correction signal to maintain the proper voltage in charge pump 60 and the proper phase relationship between the SYNC and TAPE signals. (Samples of the ramp taken in the center provide a 0 volt output from device 66.) Thus, non-zero outputs from device 66 are summed immediately in summing amplifier 62 while at the same time slowly correcting the voltage at the output of device 66 until the proper control voltage is stored entirely in charge pump 60 and the output of device 66 is zero. The magnitude of the output of device 66 is controlled by adjustable attenuator(s) 72 in a manner described hereinafter.

Two light emitting diodes (LED's) 74 and 76 are connected to the outputs of comparator 54 and to the input of inhibit gate 82. LED 74, when illuminated, indicates that the tape frequency (speed) is low relative to the SYNC IN frequency: LED 76 indicates, when illuminated, that the tape frequency is high relative to the SYNC IN frequency. A LED 78 is driven from the output of device 66 and zero phase detection circuit 80, maximum brillance of LED 78 indicating (when the output of device 66 is zero) that the tape is phase locked, dimming as the output moves either way from zero. LED's 74, 76 and 78 are inhibited from operation, as will be explained hereinafter, if TAPE signal is not present.

One of the advantages of the present invention is that in the quiescent state (no TAPE signal present) most of the circuits are inhibited (other than converter 52 and ramp generator 56) allowing the system to "remember" the last capstan speed required The voltage stored in charge pump 60 in essence corresponds to this speed, as the phase of the TAPE signal is locked to the phase of the SYNC signal. This feature allows rapid lockup when the system starts again.

Approximately 0.5 seconds (32 rising edges of the pulses from converter 58 on line 86) after the TAPE signal commences, counter 88 generates a signal on lead 90 enabling retriggerable 35 mSec one-shot 92 via flip-flop 93. The next rising pulse edge on line 86 triggers one-shot 92, enabling comparator 54 via OR gate 94. The output of OR gate 94 is connected to the inhibit input of comparator 54. Triggered one-shot 92 also enables LED 78 via a signal at the output of OR gate 85 applied to the inhibit input of phase detector 80. The 0.5 second delay so introduced allows the audio device 10 to reach play speed and converter 58 to settle. Gate 82 inhibits sampling of the ramp output of generator 56 by applying a signal to inhibit gate 68 via OR gate 98 until neither half of window comparator 54 is activated.

After approximately 8 seconds of TAPE signal (512 rising pulse edges), counter 88 generates a signal on lead 100 which sets flip-flop 102, the Q output of flip-flop 102 being coupled by two-position switch 104 (when in the "AUTO" mode) to OR gate 94 to disable comparator 54 and also set attenuator 72 via logic circuitry (not shown) to the B GAIN attenuation, the logic at startup inserting A GAIN attenuation into the system. (GAIN B attenuates the signal from device 66 to a greater degree than the GAIN A attenuation). This is the normal running state of resolver 30, wherein any capstan speed corrections necessary to maintain proper phase-lock (it is assumed that phaselock has already occurred) are made slowly by device 66 only, allowing tape splices or damaged areas to pass without significant wow or flutter. Missing tape pulses (dropouts) prevent a new sample of the ramp from being taken, allowing resolver 30 to maintain the proper speed.

If TAPE IN pulses are missing for more than 35 msec (two consecutive pulses at 60 Hertz) retriggerable one-shot 92 changes state, disabling comparator 54 (if in A GAIN mode) via OR gate 94 and inhibiting sampling of further ramp signals via the signal applied to gate 68 by OR gate 98. Additionally, LED 78 is extinguished via the signal applied to OR gate 85 although audio device 10 continues to run at the last known correct speed. If TAPE IN pulses reappear within one second, retriggerable timer 92 is triggered on the first pulse which resets gate 68. Normal sampling operations resume on the next TAPE pulse.

If tape pulses remain absent for more than one second, retriggerable one-shot 106 changes state and resolver 30 is re-initialized: A GAIN is selected; the sample and hold device 66 is set to zero by the output signal of flip-flop 93 on OR gate 110 to remove any extraneous correction signal (such as occurs when the tape transport is stopping); and the startup sequence is reset by applying the output of one-shot 106 to the reset terminals of counter 88 and flip-flops 93 and 102.

Switch 104 is utilized to lock resolver 30 in the A GAIN mode, keeping comparator 54 active at all times. In this mode, resolver 30 will track any rapid speed changes in either TAPE IN or SYNC IN frequency, enabling an operator to change SYNC IN frequency while the tape is moving or allowing resolver 30 to follow any TAPE IN signal which varies in frequency (speed). A disadvantage to the A GAIN mode is that any dropouts or splices may be interpreted as incorrect tape speed causing wow or flutter as resolver 30 attempts to correct the speed.

Although not illustrated, means may be provided that enable an operator or editing system to temporarily disable the resolver 30 and increment or decrement the tape capstan speed to allow for real-time editing and initial correction for large or small synchronization errors.

Figure 3:
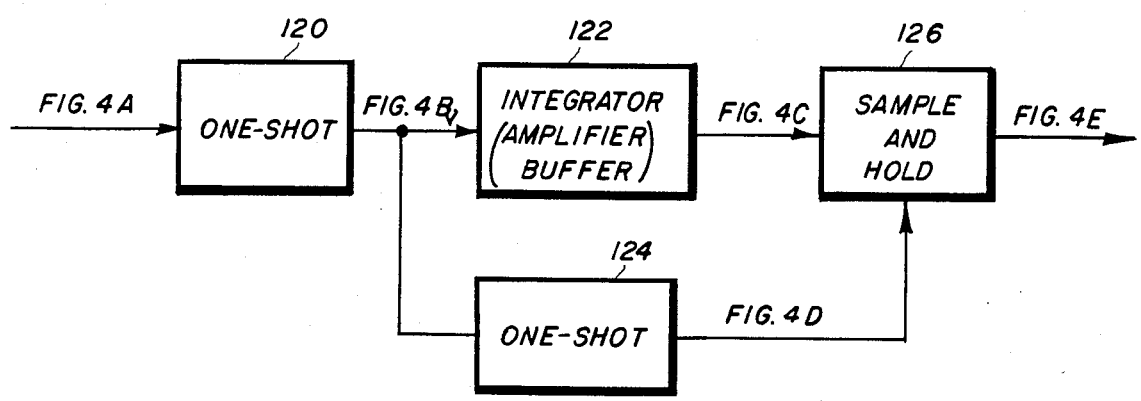
FIG. 3 is a block diagram of a novel frequency-to-voltage converter utilized in the resolver of FIG. 2.
Figure 4:
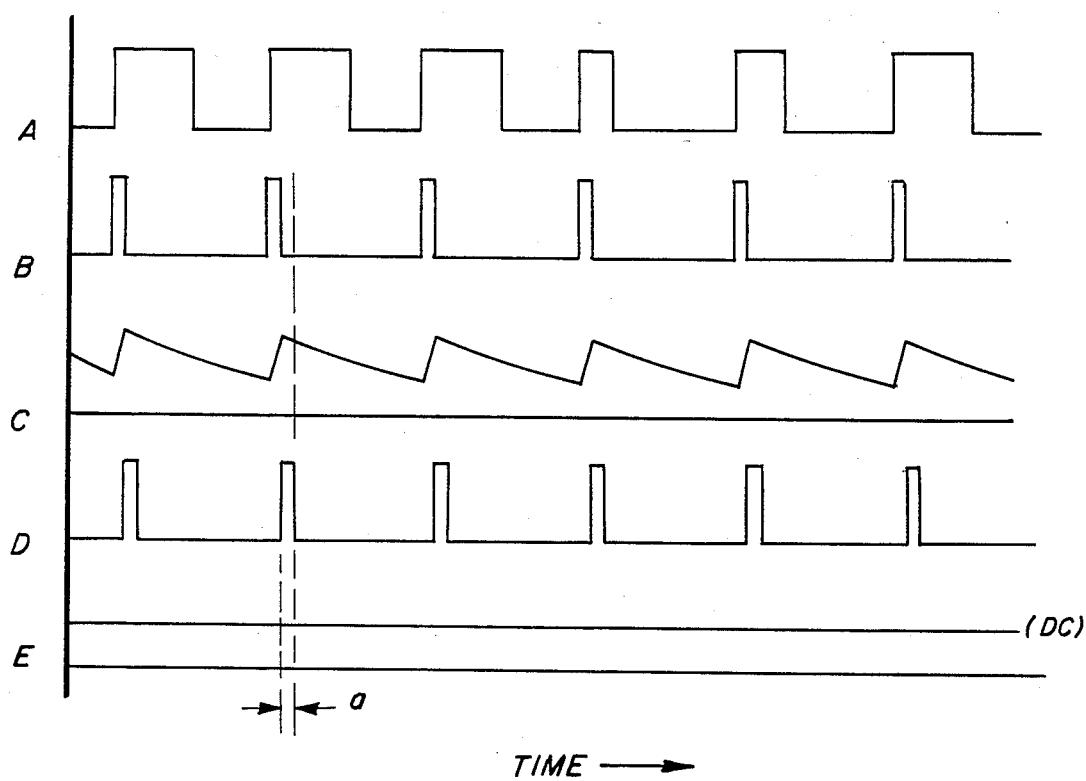
FIG. 4 comprising

As set forth hereinabove, frequency-to-voltage converters 52 and 58 have been designed to provide an output voltage with minimum ripple effects, while operating at the relatively low frequencies of system operation. FIG. 3 shows a block diagram of the novel converter of the present invention, and FIG. 4 shows the waveforms appearing at the output of the various blocks shown in FIG. 3.

The converters of the present invention maintain rapid response time while eliminating ripple as effectively as the digital method, even at low input frequencies. The basic analog method of generating a pulse train and then integrating the pulses is retained, but integration time constants are selected only on the basis of desired response time and input frequency range. All ripple is removed from the integrated pulses by utilizing a specially synchronized sample-and-hold circuit which outputs ripple-free DC while permitting a response time of only a few cycles of input frequency.

The frequency-to-voltage converter 52 (and 58) comprises a constant-width monostable multivibrator 120 which produces one pulse for each cycle of input frequency; an integrator 122 coupled to the output of one-shot 120 (a buffer/amplifier may be utilized if necessary) which integrates the output pulses from one-shot 120; an edge-triggered monostable multivibrator 124 coupled to the output of one-shot 120 which generates one pulse at the termination of each pulse from one-shot 120; and a sample-and-hold circuit 126 connected to the outputs of integrator 122 and one-shot 124 for sampling the output of integrator 122 using the pulses from one-shot 124 as sample commands.

In operation, an input signal must first be conditioned to properly trigger the constant-width monostable 120. Simple squaring of the input signal is usually sufficient, and the monostable can be triggered on either the rising or falling edge of the conditioned signal (FIG. 4A). The monostable one-shot 120 produces one pulse of constant time duration, irrespective of the input frequency, for each cycle of the input (FIG. 4B). Pulse width is chosen to be a small percentage of the period of the highest input frequency desired. These pulses are integrated by the integrator 122 (FIG. 4C) which may be an active or passive design as the surrounding circuitry dictates. Some amplification of the integrated waveform is usually desirable for better operation of the sample-and-hold device 126 but this is not required. Pulses from monostable one-shot 120 are also used to trigger monostable one-shot 124 such that such one-shot produces its pulse immediately following the pulse from one-shot. 120 (FIG. 4D). The pulse width of monostable one-shot 124 should be comparable to that of one-shot 120 (a small percentage of the period of the highest input frequency encountered). The output of integrator 122 is applied to sample-and-hold device 126, which samples this signal upon command from monostable one-shot 124. Because the sample commands occur just after each pulse is integrated (time period "a"), the sample-and-hold device 126 will store a voltage at its output approximately equal to the peak of the rippling voltage from the integrator 122, without being affected by the ripple itself. Acquisition time of the sample-and-hold device 126 can be manipulated to virtually eliminate any ripple in the output DC voltage with a constant input frequency, while still allowing very fast response time to any input frequency changes.

While the invention has been described with reference to its preferred embodiment, it will be understood by those skilled in the art that various changes may be made and equivalents may be substituted for elements thereof, without departing from the true spirit and scope of the invention. In addition, many modifications may be made to adapt a particular situation or material to the teaching of the invention without departing from its essential teachings.

What is claimed is:

1. Apparatus for adjusting the speed of recording media moving past a playback device such that the frequency of a reference signal provided by the media is in synchronism with a master signal, comprising:

a first frequency-to-voltage converter coupled to said playback device and responsive to said reference signal for generating a first voltage having a magnitude proportional to the frequency of said reference signal;

a second frequency-to-voltage converter responsive to said master signal and generating a second voltage having a magnitude proportional to the frequency of said master signal;

comparator means responsive to said first and second voltages for detecting the difference between said first and second voltages and for generating a difference signal corresponding to the difference therebetween;

means for detecting when said difference signal is within a predetermined range and for inhibiting the operation of said comparator means when said difference signal is within the predetermined range;

a storage device having first and second input means, said difference signal being coupled to said first input means, and means for detecting when said comparator is inhibited and for applying a voltage to said second input means when said comparator means is inhibited, said storage device storing a signal at its output having a magnitude proportional to the voltage which has been applied to said first and second input means; and a summing amplifier having a first input connected to the output of said storage device; the output of said summing amplifier being coupled to means for driving said recording media past said playback device at said adjusted speed.

2. The apparatus of claim 1 wherein said recording media comprises audio tape and said driving means comprises a motor driven tape capstan.

3. The apparatus of claim 1 further including means coupled to said second converter for generating a ramp signal, the start of said ramp signal and the maximum ramp voltage being determined by said second converter.

4. The apparatus of claim 3 further including means for sampling said ramp signal at a time determined by said reference frequency, the sampled output being coupled to the second input means of said storage device.

5. The apparatus of claim 4 wherein said summing amplifier has a second input and said sampled output is also applied to said second summing amplifier input.

6. The apparatus of claim 5 further including means for indicating when said reference and master signals are in phase synchronism.

7. The apparatus of claim 6 further including means for indicating when said difference signal is not within said predetermined range.

8. The apparatus of claim 4 further including means for inhibiting said comparator means and said sampling means when said reference signal is absent for a first predetermined time period, said storage device storing the voltage value corresponding to the speed of said recording media prior to the time said comparator means and said sampling means are inhibited.

9. The apparatus of claim 4 further including means for inhibiting said comparator means after a second predetermined time period, said sampling means thereafter applying the only input to said storage device.

10. The apparatus of claim 9 further including means for attenuating the output from said sampling means prior to being coupled to the second input of said storage device.

11. The apparatus of claim 10 further including means for inhibiting said comparator means and said sampling means if pulses corresponding to said reference frequency do not occur within a third predetermined time period.

12. The apparatus of claim 11 further including means for re-enabling said comparator means and said sampling means if said pulses reappear within a fourth predetermined time period.

13. The apparatus of claim 1 wherein said first converter comprises first means for producing a pulse of constant width for each cycle of reference frequency; an integrator coupled to the output of said producing means; means for generating one pulse at the termination of each pulse from said pulse producing means; and means for sampling the output from said integrator, the sampling rate being determined by said generating means.

14. The apparatus of claim 13 wherein said first means produces one pulse of constant time duration for any frequency of said reference signal.

15. The apparatus of claim 14 further including amplifier means connected between said integrator and said sampling means.

16. The apparatus of claim 15 wherein said pulse output from said first means triggers said generating means whereby an output pulse from said generating means is produced immediately following a pulse from said first pulse producing means.

17. The apparatus of claim 16 wherein said sampling means stores a voltage at its output approximately equal to the peak of the voltage from said integrator whereby the effect of voltage ripple is substantially eliminated.

* * * * *